(12) United States Patent
Rossi et al.

(10) Patent No.: US 11,752,675 B2
(45) Date of Patent: Sep. 12, 2023

(54) METHOD AND SYSTEM FOR OPERATING A FLUID ACTUATOR

(71) Applicant: INGLASS S.P.A., San Polo di Piave (IT)

(72) Inventors: Massimo Rossi, San Polo di Piave (IT); Massimo De Nadai, San Polo di Piave (IT)

(73) Assignee: INGLASS S.P.A., San Polo di Piave (IT)

(*) Notice: Subject to any disclaimer, the term of this patent is extended or adjusted under 35 U.S.C. 154(b) by 89 days.

(21) Appl. No.: 17/426,162

(22) PCT Filed: Jul. 29, 2020

(86) PCT No.: PCT/IB2020/057156
§ 371 (c)(1),
(2) Date: Jul. 28, 2021

(87) PCT Pub. No.: WO2021/019462
PCT Pub. Date: Feb. 4, 2021

(65) Prior Publication Data
US 2022/0143885 A1    May 12, 2022

(30) Foreign Application Priority Data

Jul. 30, 2019 (IT) .................. 102019000013278

(51) Int. Cl.
*B29C 45/28* (2006.01)
*F16K 31/122* (2006.01)

(52) U.S. Cl.
CPC .... *B29C 45/281* (2013.01); *B29C 2045/2848* (2013.01); *F16K 31/122* (2013.01)

(58) Field of Classification Search
CPC .......... B29C 45/281; B29C 2045/2848; F16K 31/122
See application file for complete search history.

(56) References Cited

U.S. PATENT DOCUMENTS

2015/0239162 A1    8/2015 Yang et al.

FOREIGN PATENT DOCUMENTS

| EP | 0269091 A2 | 6/1988 |
| EP | 1762361 A1 | 3/2007 |
| WO | 2018175362 A1 | 9/2018 |

*Primary Examiner* — James Sanders
(74) *Attorney, Agent, or Firm* — Mark M. Friedman

(57) ABSTRACT

A method is described for operating an actuator (10) adapted for moving by means of a pressurized fluid the shutter (12) of an injection nozzle for molten material into a mould, wherein the shutter (12) moves from a closing position, in which there is no passage of molten material through the nozzle, to an opening position, in which there is passage of molten material through the nozzle, and the shutter (12) comprises a chamber (18), and a piston (14) which is movably mounted in the chamber (18), displaced linearly thanks to the thrust of the fluid and connected to the shutter (12) to move it.
The shutter (12) is moved by inserting or removing the predetermined amount of fluid into/from the chamber (18).

12 Claims, 2 Drawing Sheets

METHOD AND SYSTEM FOR OPERATING A FLUID ACTUATOR

Figure 1:
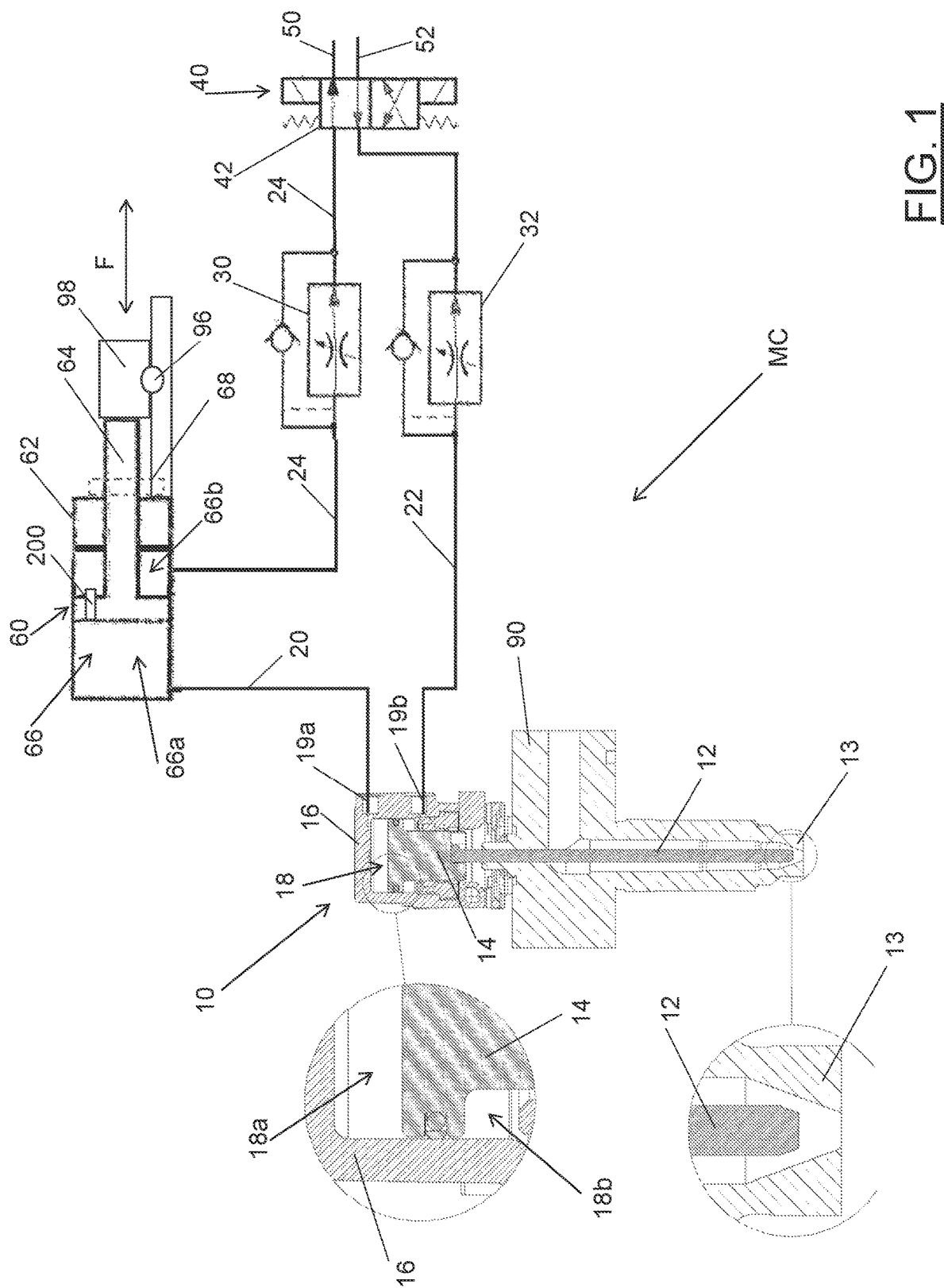

The invention relates to a method and system for operating a fluid actuator, in particular a method and system for adjusting/varying the stroke of a fluid-powered actuator.

In injection molding machines, taken as an example here, molten material is injected into a mould through one or more injection nozzles whose opening and closing is controlled by an actuator (pin). For complex parts, produced with the multi-injection method, the positional control of the shutter that opens and closes the nozzle is essential to obtain a high quality finish. In particular, it is important to be able to adjust/vary the stroke of the shutters, especially the opening stroke which determines the residual free space between the nozzle and the tip of the shutter, and consequently determines the flow rate of the material and entry speed into the mold. Currently, for molding products of value, the shutters are controlled by electric actuators, which however require complex and expensive command and control devices (an electronic control unit+related software). The use of fluid-powered actuators is therefore less expensive but they little lend themselves to precise stroke adjustment.

The main object of the invention is to improve this state of the art.

Another object is to exploit hydraulic actuators for a positional control of the shutter, of the start and end stroke positions as well as of one or multiple intermediate stop positions or of speed variation.

An aspect of the invention relates to a method for operating an actuator adapted for moving through a pressurized fluid the shutter of an injection nozzle (or more nozzles) for molten material into a mold, wherein the shutter moves from a closing position, in which there is no passage of molten material through the nozzle, to an opening position, in which there is passage of molten material through the nozzle, wherein the actuator comprises a chamber, and a piston which is movably mounted in the chamber, displaced linearly thanks to the thrust of the fluid and connected to the shutter, with the steps of determining a quantity of fluid before sending it to the actuator or extracting it from the actuator, and moving the shutter (12) by inserting or removing the predetermined amount of fluid into/from the chamber.

A preferred step envisages moving the shutter by inserting or removing a predetermined amount of fluid into/from the chamber, e.g. by moving a predetermined quantity between the chamber and an auxiliary tank.

Predetermined quantity means a quantity of fluid whose volume has been determined or defined or calculated or set before sending it to the actuator or extracting it from the actuator. The predetermination can take place e.g. by measuring the volume, the weight, or flow-rate, as well as through real-time measurement/counting (e.g. through a flow-meter with the cooperation of a valve, or similar systems) of the fluid sent/extracted into/from the piston's chamber. The predetermined amount of displaced fluid into/from the chamber ends up in a proportional linear displacement of the shutter.

In a variant, the predetermined amount of fluid is measured and determined before injecting it into the chamber. By means of the calculation of the amount of fluid injected in the chamber, e.g. through a flow-meter, it is possible to determine not only the stroke of the shutter but also any intermediate position within the total stroke of the shutter. These intermediate positions may be multiple and the shutter can stop in those positions for a predetermined time and then continue the opening movement or it can reverse the direction of movement, for a predetermined time (downstream), with subsequent restart of the opening movement.

Preferably the predetermined amount of fluid to be moved into/from the chamber is stored elsewhere, in a volume having controlled capacity, and from the volume said quantity is moved into the chamber and/or vice versa. So the predetermined quantity of fluid is determined only once and is reused in subsequent injection cycles. A throwaway system is also possible, wherein the predetermined quantity of fluid is sent to the shutter, expelled from it and then disposed of or mixed with other fluid. In this case it is necessary to re-determine said predetermined quantity of fluid at each injection.

The method applies to a unidirectional or bidirectional movement of the shutter.

In particular, the method envisages an auxiliary tank fluidly connected to the actuator's chamber, and the predetermined amount of fluid corresponds to a predetermined variation of fluid contained in the auxiliary tank, in particular the predetermined amount of fluid corresponds to a predetermined variation of the volume (capacity) of a chamber, comprised in the auxiliary tank, which contains the fluid.

The method applies both for a filling of the actuator's chamber and for an emptying of the actuator chamber.

In particular, the shutter is moved from a nozzle opening position towards a closing position by transferring said quantity from the auxiliary tank into the chamber.

In particular, the shutter is moved from a nozzle closing position towards an opening position by transferring said quantity from the chamber into the auxiliary tank.

The shutter opening position may correspond to an end-of-stroke position opposite to the closing position and/or it may correspond to a position intermediate to the end-of-stroke position opposite to the closing position.

By subtracting a volume of fluid Vc from the fluid contained in the actuator chamber, a precise displacement of the actuator piston proportional to Vc is obtained. In the same way, by extracting a volume of fluid Vt from the auxiliary tank and injecting it into the actuator chamber, a precise displacement for the actuator's piston in the opposite direction and proportional to Vt is obtained.

In particular, the quantities Vc and Vt are determined by a change in volume of the chamber in the auxiliary tank. The auxiliary tank has e.g. a variable-volume chamber capable of expanding and receiving the volume Vc and capable of contracting to expel the volume Vt.

Called Vmin the minimum volume (for example in cm$^3$) that can be reached by the chamber of the auxiliary tank after expulsion of the fluid, and called Vmax the maximum volume (e.g. in cm$^3$) that can be reached by chamber of the auxiliary tank after the injection of the fluid, it is e.g.

$$V\text{max} = V\text{min} + Vt \text{ and/or } V\text{min} = V\text{max} - Vc.$$

Vmin and/or Vmax are adjustable to determine the volume change of the chamber of the auxiliary tank, hence the determination of Vc and Vt.

Vmin may be zero, but not necessarily, i.e. the chamber of the auxiliary tank does not necessarily reach zero volume after the expulsion of Vt, and may contain a residual amount of fluid. Preferably Vc=Vt, to give cyclicality to the movement of the shutter, but not necessarily.

Therefore, according to a preferred variant of the method, the stroke of the actuator can be adjusted/varied by modifying the Vc and Vt value when needed, preferably by varying Vmax and/or Vmin.

That is, said quantity of fluid is determined by adjusting the maximum variation of the volume of the auxiliary tank's chamber.

In the light of the above, if the geometry of the auxiliary tank varies, Vmax varies, that is, the maximum quantity that can be contained by the auxiliary tank's chamber varies.

The method does not depend on the particular hydraulic circuit used to transfer the fluid, nor on the type of fluid.

According to a preferred variant of the method, the value Vmax and/or Vmin is adjusted by varying the structural configuration of the auxiliary tank.

In particular, the auxiliary tank is modified by moving a wall of a closed cavity that delimits the volume of the auxiliary tank's chamber occupied by the predetermined amount of fluid. The wall may be rigid, such as e.g. the surface of a plunger, or elastic.

Or the auxiliary tank is varied by spatially deforming the walls of a closed cavity that delimits the volume of the auxiliary tank's chamber occupied by the predetermined amount of fluid.

Or the auxiliary tank may be varied by making the walls of a closed cavity, that delimits the chamber of the volume of the auxiliary tank occupied by the predetermined amount of fluid, expand or contract, e.g. by changing the temperature of the walls or by elastic stretching.

Or the auxiliary tank is varied by varying the amount of a filler material present inside a closed cavity that delimits the chamber of the auxiliary tank's volume occupied by the predetermined amount of fluid. The volume of the filler material subtracts from the volume available for the fluid, and therefore Vc and Vt decrease. By removing filler material the volume available to the fluid increases, and thus Vc and Vt increase.

According to a preferred variant of the method, the auxiliary tank has the closed cavity or chamber delimited by a piston, and the linear position of the auxiliary tank's piston is detected while the fluid is transferred from the auxiliary tank's chamber to a chamber of the actuator, an end-of-stroke position of the shutter is determined by adjusting the stroke of the piston of the auxiliary tank by exploiting the proportionality between change in the position of the auxiliary tank's piston, amount of fluid transferred between the auxiliary tank and the actuator's chamber following the movement of the auxiliary tank's piston, and variation of the shutter's position.

Another aspect of the invention concerns a system for driving an actuator which comprises a chamber and a piston that is movable/displaceable inside the chamber following the action of a pressurized fluid on the piston, and connected to the shutter of an injection nozzle of molten material for injection moulding, the system being configured to adjust/vary the shutter stroke of the actuator and comprising a device or means for forcing the transfer of a predetermined amount of fluid between the outside and inside of the chamber, wherein the amount of fluid is determined before sending it to the actuator or extracting it from the actuator, so as to bring/move the shutter from a closing position, in which there is no passage of molten material, towards an opening position, in which there is passage of molten material, by injecting the predetermined amount of fluid from the outside into the chamber or by injecting the predetermined quantity of fluid from the chamber to the outside, and/or so as to bring/move the shutter from an opening position, in which there is passage of molten material, towards a closing position, in which there is no passage of molten material, by extracting the predetermined quantity of fluid from the chamber or by sending the predetermined quantity of fluid into the chamber, respectively.

In particular the system comprises an auxiliary tank for fluid (preferably external to the actuator) configured for containing a volume of fluid, a circuit for fluid for putting the chamber and the auxiliary tank into fluid communication, a device or means for forcing the transfer of a predetermined amount of fluid between the auxiliary tank and the chamber, so as to bring/move the nozzle's shutter from a closing position, in where there is no passage of molten material, to an opening position, in which there is passage of molten material, by injecting fluid from the auxiliary tank to the chamber or by injecting fluid from the chamber to the auxiliary tank, and/or so as to bring/move the nozzle's shutter from an opening position, in which there is passage of molten material, to a closing position, in which there is no passage of molten material, by extracting fluid from the chamber and putting it inside the auxiliary tank or by extracting fluid from the auxiliary tank and putting it into the chamber, respectively.

The shutter may be part of the actuator or not.

In particular, the system comprises a device or means for determining and/or adjusting the amount of transferred and/or transferable fluid from the auxiliary tank to the chamber and vice versa.

With said system it is possible to adjust e.g. the total and maximum stroke of the piston of the actuator, corresponding to the shutter's opening end-of-stroke position, the closuring end-of-stroke position of the shutter being defined by a mechanical abutment of the shutter against the nozzle gate (conical shutting) or of the piston itself against an abutment made in the body of the actuator (cylindrical shutting).

According to a preferred variant, which allows adjusting an end-of-stroke position of the piston, the auxiliary tank comprises an adjustable volume to contain the fluid to be sent into the chamber or to be received by the chamber. In other words, referring to what has been already explained for the method, the auxiliary tank is configured to be able to vary its own Vmax and/or Vmin.

Preferably the auxiliary tank has a fluid capacity which is adjustable.

The fluid capacity of the auxiliary tank is adjustable in various ways.

E.g. the auxiliary tank comprises a closed cavity adapted to contain said predetermined amount of fluid; wherein the closed cavity can reach a minimum volume Vmin and/or a maximum volume Vmax. In particular, the auxiliary tank comprises a deformable shell defining said closed cavity; wherein the shell is deformable so that the closed cavity reaches the minimum volume Vmin and/or the maximum volume Vmax.

In particular, the closed cavity may comprise a movable wall to vary the internal volume of the cavity. The wall may be rigid, such as e.g. the surface of a plunger, or elastic; and/or expandable or contractable walls, e.g. through means for varying the temperature of the walls or by elastic stretching of the walls.

Or the auxiliary tank comprises a closed cavity with a filler material inside, and means for varying the amount of filler material in the closed cavity, so that the variation of filler material determines a minimum residual volume Vmin and a maximum residual volume Vmax of the cavity that can be occupied by the fluid.

In a variant, the auxiliary tank comprises a piston which is displaceable/movable inside a chamber of the auxiliary tank following the action of the pressurized fluid, the auxiliary tank's chamber being divided by the piston into a first sub-chamber fluidically connected with the actuator's chamber, and a second sub-chamber fluidically connected to said device or means for forcing the transfer, the first and second sub-chamber remaining defined on opposite sides of the piston, the piston stroke being adjustable to define the maximum and/or minimum volume of the first sub-chamber.

In particular, the system comprises mechanical, electrical and/or electronic means for adjusting and controlling said piston's stroke (e.g. linear encoders, rotary encoders, laser or infrared reading systems, mechanical screw stops, screw/nut screw systems, optic fiber, switches, microswitches, etc.).

Preferably the system comprises an electronic control unit for controlling the system's components, especially the piston and the device or means for forcing the transfer of the predetermined amount of fluid, and the means cited in one or each of the claims.

The adjustment or control means are preferably connected to the control unit to give the real-time position of the piston. Based on such position the control unit is able to determine/vary the movement of the piston and consequently of the shutter (it is possible to vary the stop position, the movement speed of the shutter by increasing or decreasing it, the elapsed time when stopped, etc.).

According to a preferred variant of the method and of the system, the auxiliary tank has the closed cavity or chamber delimited by a piston, and in particular said movable wall in the closed cavity may advantageously be a surface of the aforesaid piston.

Said wall or piston in the auxiliary tank may e.g. be movable between two positions, and the volume swept by the wall determines the volume of said predetermined amount of fluid. In particular, the wall or piston of the auxiliary tank is mounted in such a way that at one of said two positions it abuts against a movable abutment element. The position of the movable abutment element is adjustable and one can then adjust the position of one of said two positions, and hence the volume of said predetermined amount of fluid. In a variant, the movable abutment element is an element screwable in the auxiliary tank's body.

Preferably the auxiliary tank comprises a locking element for blocking the position of the movable abutment element.

E.g. a linear position sensor can communicate with the control unit which processes the data outputted by the sensor, showing the position of the shutter on a display, and allowing a human operator to verify the correct functioning of the system inside the mold.

In a variant, the circuit comprises a first fluid transport line between the chamber and the auxiliary tank, a second fluid transport line between the chamber and the means or device for forcing the transfer of fluid, a third fluid transport line between the auxiliary tank and the means or device for forcing the transfer of fluid, wherein the first and second lines open into the actuator's chamber for injecting into and/or extracting fluid from opposite sides of the piston, the third line carrying fluid different and isolated from that which flows in the first line.

In particular, the circuit comprises a first fluid transport line between the chamber and the first sub-chamber, a second fluid transport line between the chamber and the means or device for forcing the transfer of fluid, a third fluid transport line between the second sub-chamber and the means or device for forcing the transfer of fluid, wherein the first and second lines open into the actuator's chamber to inject into and/or extract fluid from opposite sides of the piston, the third line carrying fluid different and isolated from that which flows in the first line and opening into the second sub-chamber of the auxiliary tank to inject or extract fluid on one side of said two opposite sides of the auxiliary tank's piston.

The direction of displacement/movement of the fluid from the auxiliary tank to the actuator, like the related connections, may be inverted without changing the effects and advantages of the invention (e.g. like inverting the inlets of the line 19a with line 19b, see the following figures).

Preferably, there are means for putting the two sub-chambers into fluidic communication, for initial fillings or fluid vents.

In a variant, the volume variation of said closed cavity or chamber of the auxiliary tank (e.g. the fluid transfer to the second sub-chamber) takes place by pushing the fluid through an air or gas circuit.

In a variant, the system comprises means for varying the fluid present in one of the two fluid transport lines (therefore in chambers 18a and 18b, see below), by using for example air or gas (compressible fluids). The variation of the fluid involves the addition or modification of some of the circuit components, but the principle of operation does not change.

In a variant, the system comprises a mechanical (e.g. spring) system for obtaining the movement of the shutter in the actuator in one direction.

Preferably the system comprises leaks or overflows for initially filling the first line with fluid or compensating for any fluid leakages.

Another aspect of the invention relates to a software for performing one or each of the method steps by controlling the fluid flow.

The invention is applicable e.g. to systems with shutter having conical or frusto-conical end cooperating with a gate having a cavity of complementary shape, or to systems with shutter having a cylindrical end cooperating with a gate having a cavity of complementary shape.

The invention is also applicable e.g. to systems where the auxiliary tank supplies multiple actuators; and/or in which an actuator controls several shutters simultaneously (the actuatoris piston is integral with multiple shutters).

A variant of the invention offers the advantage of being able to monitor the shutter's position and/or speed and/or acceleration indirectly, without acting directly on the actuator fixed on the hot runner inside the mold. Indeed, it should be noted that the instantaneous position of the shutter can be derived by measuring in real time, for example with a flow-meter, the quantity of fluid that passes into/from the auxiliary tank, the fraction of said predetermined quantity of fluid that has arrived in the shutter chamber and/or that has come out, the position of said wall or piston, The position of said wall or piston may be advantageously monitored e.g. by a position sensor, e.g. a linear sensor (of various types: potentiometric, optical fiber, magnetic, laser, etc.). The sensor then allows indirectly monitoring the instantaneous position of the shutter's piston.

This aspect also highlights a diagnostic application of the above method or system, i.e. to detect any malfunctions of the hydraulic system or oil leaks or overflows cycle after cycle. The above method or system can be applied to a pre-existing plant to verify the correct driving of a shutter during the injection phase.

To obtain maximum precision, said fluid is preferably a liquid, e.g. oil. The liquid is incompressible and guarantees proportionality between the volume of displaced fluid and the linear displacement of the actuator's piston.

Figure 2:
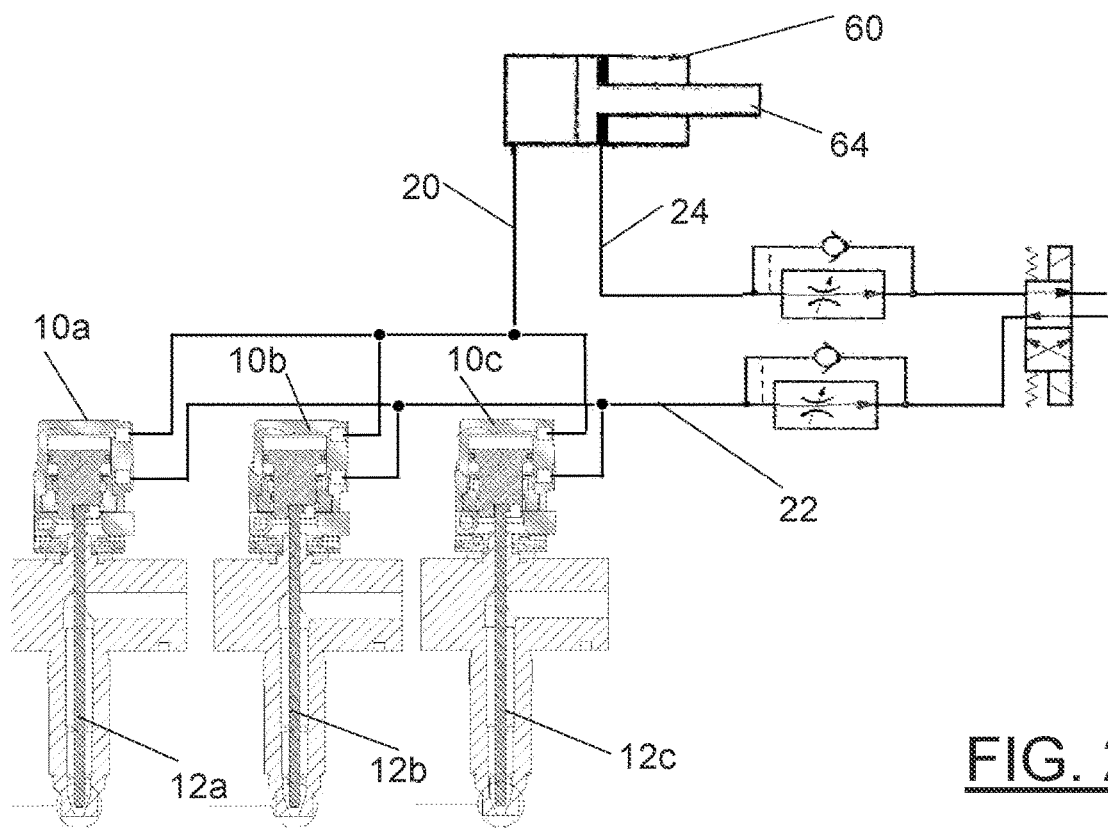
Figure 3:
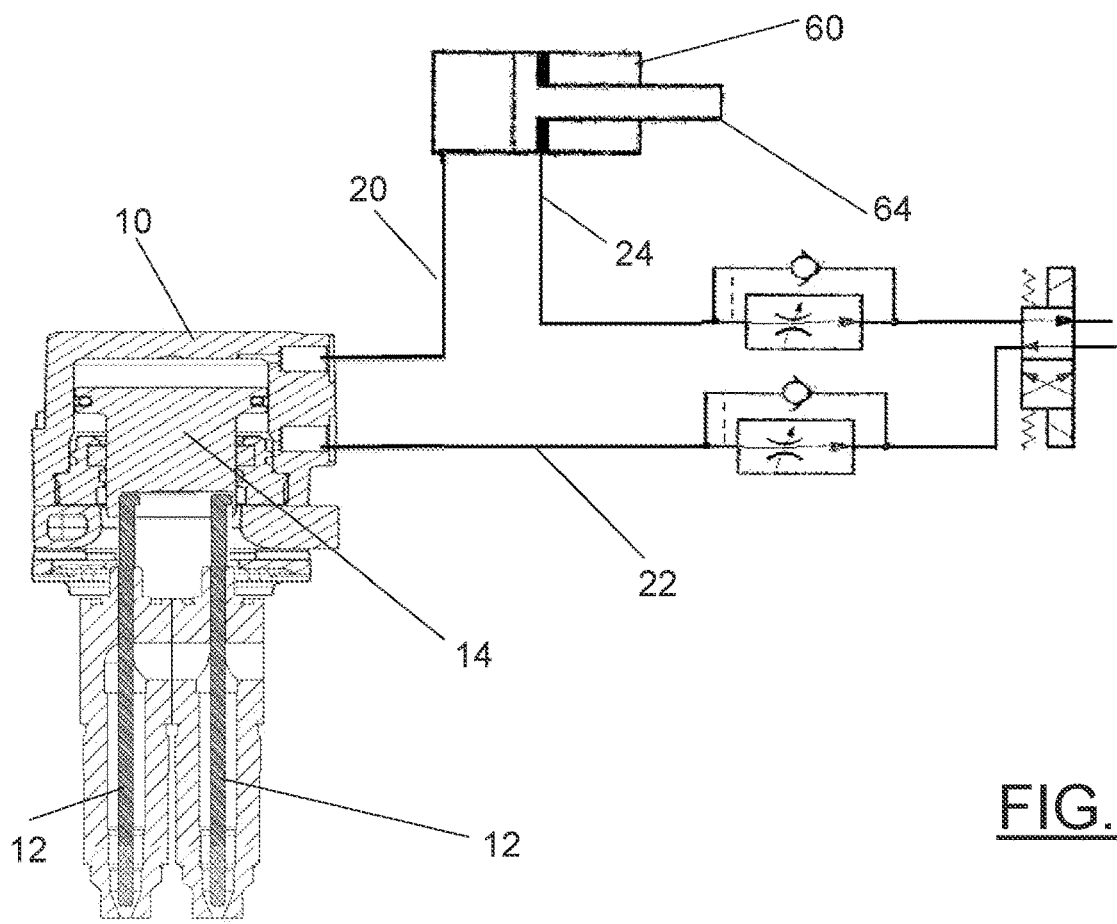

The advantages of the invention will be even clearer from the following description of a preferred system, in which reference is made to the attached drawing in which FIG. 1 shows a diagram of the system;

FIGS. 2 and 3 show a scheme of variants of the system.

In the figures, like elements are indicated by same numbers.

The MC system of FIG. 1 is used to control an actuator 10.

The actuator 10 is fixed on a support, such as for example a hot runner 90 (manifold) or a plate or a mold, and is intended for the displacement/driving of a shutter 12 for an injection nozzle 13.

The shutter 12 is connected to a piston 14 which is linearly movable inside a chamber 18 defined by a casing 16.

In the example of FIG. 1 the chamber 18 is divided by the piston 14 into a first chamber 18a, communicating with an inlet 19a, and a second chamber 18b, communicating with an inlet 19b. The chamber 18a is e.g. isolated from the chamber 18b.

Through the fluid inlets 19a, 19b it is possible to inject or extract fluid, e.g. oil, respectively into the chamber 18a or 18b on opposite sides of the piston 14, so as to be able to move it linearly in opposite directions. Therefore, by injecting and extracting alternatively fluid in the chambers 18a and 18b the piston 14 can be moved, and consequently the shutter 12. The movement of the latter determines the opening or the closing of the nozzle 13 with the consequent passage or obstruction of the molten material. The closing end-of-stroke position of the shutter 12 is established by the mechanical abutment of the shutter 12 against the so-called "gate" of the nozzle 13 so that there is no passage of molten material, or a suitable end-of-stroke abutment is provided between the piston and the body of the actuator 10.

The stroke of the shutter 12 from the closing position to the maximum opening position or towards the opening end-of-stroke position is, as it will be seen below, adjustable.

A tank 60, external to the actuator 10, comprises an external casing 62 with inside a piston 64 linearly movable inside a chamber 66 defined by the casing 62. The piston 64, like the piston 14, divides the chamber 66 into two sub-chambers 66a, 66b.

A first line 20 allows transferring fluid, through the inlet 19a, from the chamber 18a to the chamber 66a and vice versa, while a second line 22 allows transferring fluid, through the inlet 19b, from the chamber 18b to the chamber 66b and vice versa.

The second line 22 is connected and cooperates with a third line 52 connected to a pump (not shown) that allows the fluid to circulate on a fourth line 50 to make it return through a fifth line 24 to the chamber 66b of the tank 60.

Through the first line 20 the fluid is injected into the chamber 18a against one side of the piston 14, while through the line 22 the fluid is injected into the chamber 18b on the opposite side of the piston 14. Similarly, fluid is injected through the line 20 into the chamber 66a against one side of the piston 64, while through the line 24 the fluid is injected into the chamber 66b on the opposite side of the piston 64. By injecting fluid from the line 24 into the chamber 66b the piston 64 is pushed against the chamber 66a.

The fluid in the line 24 is isolated from that in the line 20, to conserve a constant quantity of fluid in the chamber 66a, but the fluid changes in the lines 20, 22, 52, 50 and 24 are substantially equal, so that they actually form a closed fluid circuit.

Preferably, leaks or overflows are provided to initially fill with fluid the line 24, the chamber 66a and the chamber 18a, or to compensate for any small leakages of fluid during operation.

The tank 60 is equipped with manual or servo-assisted means 68 for regulating or varying the maximum amplitude of the stroke of the piston 64 towards the chamber 66b, in order to adjust the maximum volume of the chamber 66a (or—which is the same—the minimum volume of the chamber 66b). The means 68 may be made e.g. with a mechanical abutment 98 between the piston 64 and the casing 62, where the position of the abutment point or of the mechanics abutment 98 is adjustable along the translation axis of the piston 64 (see arrow F). Preferably there is a locking means 96 for blocking the position of the mechanical stop 98 after it has been selected.

The tank 60 is preferably provided with means (not shown) for detecting the linear position of the piston 64, for a remote and automatic position control and/or for a precise position regulation. E.g. the position of the piston 64 is detected by a linear encoder, a Hall sensor, a mechanical gear/nut screw system, etc.

In the lines 24, 22 there are also inserted optional flow regulators 30, 32, which allow, in addition to a homogeneous movement, the setting of different movement speeds for the piston 14.

A fluid diverter 40, having a movable distributor 42, serves to reverse, at each complete cycle, the flow direction of the fluid in the circuit, which determines the direction of movement of the shutter 12, upon opening or closing.

Operation

By injecting fluid into the chamber 18a, through the action of the pump, from the line 20, the shutter 12 can be moved from the opening position to the closing position, or towards the closing end-of-stroke position (downwards in FIG. 1).

In this phase the total quantity of fluid Q1 injected into the chamber 18a from the line 20 coincides with a change in the amount of fluid stored in the chamber 66a. Such variation in the quantity of fluid can be determined e.g. by adjusting the stroke-limit means 68 of the piston 64 when it moves towards (and against) the chamber 66a, or it is automatically determined by the maximum volume that the chamber 18a reaches in correspondence of the closing end-of-stroke position. Or the aforementioned change in quantity of fluid is determined/processed by the control unit on the basis of the detection, through suitable means not shown (e.g. a linear encoder), of the actual position of the piston 64. In this way the volume variation of fluid in motion can be changed remotely (via a tablet or the like) without the need to act next to the machine/press. The linear encoder, or similar means, is also suitable for detection and control of intermediate stop positions for the shutter.

It is not necessary for the piston 64 to end up nulling the volume of the chamber 66a.

By injecting fluid into the chamber 18b, through the action of the pump, from the line 22, the shutter 12 can be moved from the closing position to the opening position, or towards the opening end-of-stroke position (upwards in FIG. 1). The fluid coming from the line 22 pushes the piston 14 against the chamber 18a. The piston 14 in turn pushes fluid out of the chamber 18a and into the chamber 66a, to move the piston 64 in the opposite direction. In this phase, the quantity of fluid Q2 which can be moved from the chamber 18a to the chamber 66a is determined by the stroke-limit means 68 of the piston 64 when it moves towards the chamber 66b.

It is Q1=Q2, wherein the amplitude of the backward stroke of the piston 64 establishes what is the volume of displaced fluid Q2.

The backward stroke of the piston 64 is adjusted by the means 68 to define the volume/quantity of fluid to be moved, inserted and/or extracted from/to the chamber 18a, in order to obtain the desired, e.g. opening, stroke for the shutter 12; e.g. a stroke of 10 to 40 mm, e.g. 25 mm.

By acting on the means 68, Q1 and Q2 can be varied.

The geometry of the system ensures that a change of fluid Q1, Q2 in the chamber 18 translates into a corresponding displacement of the piston 14. The value Q1, Q2 then determines a constraint on the motion of the piston 14 inside the chamber 18, thereby establishing the stroke amplitude and/or the opening end-of-stroke position thereof.

Preferably, the maximum volume of the fluid contained in the chamber 66a is always greater than the maximum volume of the chamber 18a, so that there is a reserve of fluid necessary to compensate for any leaks between the various branches of the fluid circuit.

Note that to reverse the movement of the shutter, the line 20 can supply the inlet 19b and the line 22 can supply the inlet 19a.

Variants

The described system and method can control the shutter for a single nozzle or, according to the same logic, could control simultaneously two or more nozzles with the same actuator, see FIG. 3.

Or (FIG. 2) more shutters 12a, 12b, 12c (in the example, three) with relative different actuators 10a, 10b, 10c are connected to the tank 60 through by-passing lines 20, 22 to be fed with fluid therefrom. The volume of fluid moving in the circuit will be proportionally modified, with suitable means not shown, by dividing among the various actuators the volume of displaced fluid, essential in sequential injection systems.

Of course, the invention can also be applied, without substantial modifications, in systems wherein the actuator and/or the external tank requires the use of a multiple-stage and/or multiple-chamber piston (see WO2004027302). In the variant shown in FIG. 1, the external tank 60 exhibits a piston 64 movable inside a chamber 66 thanks to the thrust of the fluid. In a variant, the piston 64 can be operated from the outside of the tank 60 in a controlled manner, so that the piston 64 follows a dynamic reference (e.g. a speed and/or position reference) to control the dynamics of the shutter 12 accordingly.

E.g. the piston 64 can be operated by an electric gearmotor controlled by an electronic control unit, through which various dynamic profiles are applicable to the piston 64.

To balance the pressure between the chambers 66a, 66b and/or expel any air pocket that can form during the initial filling of the fluid, the MC system preferably comprises means for selectively placing the chambers 66a, 66b into communication with each other.

In particular, the MC system comprises for this purpose a valve 200 arranged on the head of the piston 64. The valve 200, when open, allows the passage of fluid between the chambers 66a and 66b, while, when closed, it does not allow this passage. During the whole reciprocating movement of the piston 64 the valve 200 remains closed, while it is mounted so as to get opened when the piston reaches the end-of-stroke position corresponding to the maximum shrinkage of the chamber 66b. that is, only when the upper dead point of the shutter 12 is reached. At such point the valve 200 is pushed and opens upon contact with the internal surface of the the casing 62, thus allowing the outflow of fluid from the chamber 66b to the chamber 66a.

Preferably the MC system comprises a manual opening system for the valve 200, advantageous in the installation phase, which in particular comprises means for pushing the head of the piston 64 against the internal surface of the casing 62. E.g. the movable abutment element 98 can be made integral with the piston 64 and exploited for dragging the piston 64 towards an end-of-stroke position and opening the valve 200.

An appropriate programming of the injection cycle allows the control unit to command/drive the described components in order to achieve any of the opening and/or closing profiles described and shown in the following documents: PCT/IB2019/053936, IT102017000037002, IT102016-000080198, IT102016000055364, IT102015000008368, 1TTO2014A001030, 1TTO2014A001021, 1TTO2014-A000701, WO2012/074879A1, WO2012/087491A1, WO2018/020177A1.

The invention claimed is:

1. Method for operating an actuator adapted for moving by means of a pressurized fluid the shutter of an injection nozzle for molten material into a mould,
   wherein the shutter
      moves from a closing position, in which there is no passage of molten material through the nozzle, to an opening position, in which there is passage of molten material through the nozzle, and a system for operating the actuator comprises
      a chamber and
      a piston which is movably mounted in the chamber displaced linearly due to the thrust of the fluid and connected to the shutter to move it,
   with the steps of
   predetermining an amount of fluid whose volume has been determined or defined or calculated or set before sending it to the actuator or extracting it from the actuator, and
   moving the shutter by inserting or removing the predetermined amount of fluid into or from the chamber,
   so that said predetermined amount of displaced fluid into/from the chamber results in a proportional linear displacement of the shutter.

2. Method according to claim 1, wherein an auxiliary tank is fluidly connected to the actuator's chamber and the predetermined amount of fluid corresponds to a predetermined variation of a fluid volume contained in the auxiliary tank.

3. Method according to claim 2, wherein said predetermined amount of fluid is determined by adjusting the maximum variation of the volume of a chamber of the auxiliary tank.

4. Method according to claim 3, wherein the auxiliary tank is modified by moving a wall of a closed cavity that defines the volume of the chamber of the auxiliary tank occupied by said predetermined amount of fluid.

5. Method according to claim 3, wherein the auxiliary tank is modified by spatially deforming the walls of a closed cavity which delimits the volume of the auxiliary tank occupied by the fluid.

6. Method according to claim 1, wherein the auxiliary tank has a cavity or closed chamber delimited by a piston and
- the linear position of the piston of the auxiliary tank is detected while fluid is transferred from the chamber of the auxiliary tank to a chamber of the actuator, and
- an end-of-stroke position of the shutter is determined by adjusting the stroke of the piston of the auxiliary tank by exploiting the proportionality between
  - position variation of the piston of the auxiliary tank,
  - amount of fluid transferred between the auxiliary tank and the actuator chamber following the movement of the piston and
- position variation of the shutter.

7. Method according to claim 1, wherein said predetermining takes place by measuring a volume of the fluid sent or extracted into or from the chamber.

8. Method according to claim 1, wherein said predetermining takes place by measuring a weight of the fluid sent or extracted into or from the chamber.

9. Method according to claim 1, wherein said predetermining takes place by measuring a flow-rate of the fluid sent or extracted into or from the chamber.

10. Method according to claim 2, wherein the predetermined amount of fluid corresponds to a predetermined variation of a volume of a chamber of the auxiliary tank.

11. Method according to claim 3, wherein the auxiliary tank is varied by varying an amount of a filler material present inside a closed cavity that delimits the chamber of the auxiliary tank's volume occupied by the predetermined amount of fluid.

12. Method according to claim 3, wherein said maximum variation is adjusted by varying a structural configuration of the auxiliary tank.

* * * * *